US010877125B1

(12) United States Patent
Ward

(10) Patent No.: US 10,877,125 B1
(45) Date of Patent: Dec. 29, 2020

(54) SYSTEM AND METHOD FOR COUNTERING DRONES

(71) Applicant: Government of the United States as represented by the Secretary of the Air Force, Wright-Patterson AFB, OH (US)

(72) Inventor: Benjamin G. Ward, Colorado Springs, CO (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 0 days.

(21) Appl. No.: 16/432,010

(22) Filed: Jun. 5, 2019

(51) Int. Cl.
| G01S 3/04 | (2006.01) |
| H01Q 3/02 | (2006.01) |
| H04W 4/40 | (2018.01) |
| H04K 3/00 | (2006.01) |
| H01Q 15/14 | (2006.01) |
| G01S 19/42 | (2010.01) |

(52) U.S. Cl.
CPC .............. G01S 3/046 (2013.01); H01Q 3/02 (2013.01); H01Q 15/14 (2013.01); H04K 3/92 (2013.01); H04W 4/40 (2018.02); G01S 19/42 (2013.01)

(58) Field of Classification Search
CPC .......... G01S 3/046; G01S 19/42; G01S 13/06; H04W 4/40; H04W 12/08; H01Q 3/02; H01Q 15/14; H04K 3/92; B64C 39/024; H04B 17/391; H04L 63/1416
See application file for complete search history.

(56) References Cited

U.S. PATENT DOCUMENTS

| 5,523,761 | A | * | 6/1996 | Gildea | G01S 19/36 266/207 |
| 9,797,978 | B1 | * | 10/2017 | Melamed | G01S 3/14 |
| 9,847,035 | B1 | * | 12/2017 | Melamed | G01R 23/00 |
| 9,862,489 | B1 | | 1/2018 | Weinstein et al. | |
| 9,996,079 | B2 | | 6/2018 | Magy et al. | |
| 10,094,855 | B1 | * | 10/2018 | Fuhr | G01R 13/0281 |
| 10,374,732 | B1 | * | 8/2019 | Melamed | G01R 23/00 |
| 2006/0271251 | A1 | * | 11/2006 | Hopkins | G05D 1/0038 701/23 |
| 2011/0267222 | A1 | * | 11/2011 | Craig | G01S 3/30 342/25 B |
| 2014/0152811 | A1 | * | 6/2014 | Kwon | H04B 17/309 348/135 |
| 2015/0187134 | A1 | | 7/2015 | Baecher et al. | |

(Continued)

OTHER PUBLICATIONS

Sandia National Laboratories Report SAND2015-6365, UAS Detection, Classification, and Neutralization: Market Survey 2015.

*Primary Examiner* — Orlando Bousono

(74) *Attorney, Agent, or Firm* — AFMCLO/JAZ; Jeffrey Moore

(57) ABSTRACT

In accordance with various embodiments of the disclosed subject matter, a system, apparatus and method is configured to receive/process radio frequency emanations of a potentially threatening drone to generate therefrom a human-recognizable audio signal characteristic of the drone (i.e., a "voice" of the drone) so that a warfighter may be alerted to the activity of the drone and respond accordingly.

19 Claims, 3 Drawing Sheets

(56) References Cited

U.S. PATENT DOCUMENTS

| | | | |
|---|---|---|---|
| 2015/0350914 A1* | 12/2015 | Baxley | H04W 12/1208 |
| | | | 726/11 |
| 2016/0025845 A1* | 1/2016 | Allistair | G01S 7/354 |
| | | | 342/128 |
| 2016/0086621 A1* | 3/2016 | Hearing | G01H 1/00 |
| | | | 340/943 |
| 2016/0124071 A1* | 5/2016 | Baxley | G06F 16/285 |
| | | | 348/143 |
| 2016/0127931 A1* | 5/2016 | Baxley | G01S 5/0263 |
| | | | 455/67.16 |
| 2017/0039413 A1 | 2/2017 | Nadler | |
| 2017/0092138 A1 | 3/2017 | Trundle et al. | |
| 2017/0148467 A1 | 5/2017 | Franklin et al. | |
| 2017/0227956 A1* | 8/2017 | Cesarano | G05D 1/0088 |
| 2017/0302364 A1* | 10/2017 | Cesarano | G06K 9/00637 |
| 2018/0011180 A1* | 1/2018 | Warnick | G01S 13/06 |
| 2019/0113610 A1* | 4/2019 | Vacanti | G01S 7/352 |
| 2019/0180630 A1* | 6/2019 | Kleinbeck | G06N 3/0445 |
| 2019/0208112 A1* | 7/2019 | Kleinbeck | G01S 3/00 |
| 2019/0306675 A1* | 10/2019 | Xue | G05D 1/101 |

\* cited by examiner

SYSTEM AND METHOD FOR COUNTERING DRONES

GOVERNMENT INTEREST

The invention described herein may be manufactured and used by or for the Government of the United States for all governmental purposes without the payment of any royalty.

FIELD OF THE DISCLOSURE

The present disclosure relates to unmanned vehicles (UVs) or drones and, more specifically, to the detection and rapid deployment of countermeasures associated with such UVs.

BACKGROUND

There exists a need for light ground forces to be able to counteract small weaponized semi-autonomous aircraft, ground vehicles and the like such as weaponized small commercial drones. Currently available electronic warfare systems do not meet this need due to their size, weight, power requirements and/or expert knowledge required to operate them.

SUMMARY OF THE INVENTION

Various deficiencies in the prior art are addressed below by the disclosed systems, methods, architectures, mechanisms, apparatus and the like configured to receive/process radio frequency emanations of a potentially threatening drone to generate therefrom a human-recognizable audio signal characteristic of the drone (i.e., a "voice" of the drone) so that a warfighter may be alerted to the activity of the drone and respond accordingly.

Various embodiments contemplate the use of a small parabolic dish antenna for supporting manual or automatic direction-find (DF) actions in a manner familiar to a warfighter; namely, by noting a rise in strength of the audible signal as the dish points more directly at the drone such as known from targeting systems that produce "tone" when locked on. Various embodiments enable subsequent warfighter action such as transmitting a jamming signal through the dish (e.g., using signals synthesized based on the parameters obtained during the voice modulation process). Various embodiments provide distinctive "voices" to different drones to facilitate tracking discrimination (human or automated).

An apparatus supporting rapid assessment of unmanned vehicles (UVs) according to one embodiment comprises an antenna, for receiving a radio frequency (RF) signal associated with one or more unmanned vehicles; a radio frequency input module, for converting the received radio frequency signal into a corresponding audio frequency (AF) signal; and an audio processing module, for processing the audio frequency signal to provide an audio output signal configured to generate an audible output signal through an output device, wherein properties of the generated audible output signal correlate with properties of the received radio frequency signal such that a user can audibly ascertain the location of a first unmanned vehicle.

The present invention may include an apparatus supporting rapid assessment of an unmanned vehicle, comprising an antenna, for receiving a radio frequency signal associated with one or more unmanned vehicles. The present invention may further include a radio frequency input module, for converting the received radio frequency signal into a corresponding audio frequency signal; and an audio processing module, for processing the corresponding audio frequency signal to provide an audio output signal, further configured to generate the audible output signal through an output device, wherein properties of the audible output signal correlate with properties of the radio frequency signal such that a user can audibly ascertain the location of a first unmanned vehicle, the first unmanned vehicle being capable of receiving at least one unmanned vehicle control signal.

The present invention may further include properties of the audible output signal correlate with properties of the radio frequency signal such that a user can audibly ascertain a direction of travel of the first unmanned vehicle. The present invention may further include properties of the audible output signal correlate with properties of the radio frequency signal such that a user can audibly ascertain a global positioning system (GPS) position of the first unmanned vehicle. The present invention may further include properties of the audible output signal correlate with properties of the radio frequency signal such that a user can audibly ascertain at least one of a location and direction of travel of one or more additional unmanned vehicles. The present invention may further include properties of the audio output signal comprise at least one of pitch, timbre and duration. The present invention may further include wherein the antenna is a directional antenna configured to provide increasing gain to the received radio frequency signal as the antenna is directed toward the unmanned vehicles.

The present invention may further include wherein the antenna comprises any of a hand-held parabolic antenna, helical antenna, Yagi-Uda antenna and a phased array antenna. The present invention may further include wherein the antenna includes an angle adjustment capability. The present invention may further include wherein the audio processing module comprises frequency adaptation components configured to adjust a spectral profile of the audio output signal. The present invention may further include wherein the frequency adaptation components comprise at least one of an audio filter configured to limit a spectral range of the corresponding audio frequency signal, an audio equalizer configured to adjust power levels of each of a plurality of spectral regions and an audio amplifier. The present invention may further include wherein the frequency adaptation components further comprise an auto-tune module configured to shift individual frequency components to a closest configured frequency bin.

The present invention may further include wherein the radio frequency input module includes a radio frequency demodulator configured to extract an intermediate frequency signal associated with one or more spectral regions associated with unmanned vehicle control signals, and a frequency divider configured to generate the audio frequency signal using the intermediate frequency signal. The present invention may further include a radio frequency output module, for generating a radio frequency output signal in response to the corresponding audio frequency signal, the radio frequency output signal being configured for transmission toward the first unmanned vehicle, via the antenna to interfere with the at least one unmanned vehicle control signal.

The present invention may further include wherein the radio frequency output module is operative to forward the radio frequency output signal to the antenna in response to a trigger signal. The present invention may further include comprising at least one of a radio frequency circulator and a diplexer for coupling the forwarded radio frequency output signal to the antenna. The present invention may further include comprising a radio frequency oscillator configured to provide a demodulation tuning frequency for the radio frequency input module and a synthesizer frequency for the radio frequency output module such that the radio frequency output signal comprises a carrier frequency having modulated thereon a signal conforming to a spectral envelope associated with the one or more spectral regions associated with unmanned vehicle control signals.

The present invention may further include a radio frequency output module, for generating a radio frequency output signal in response to at least one of the radio frequency signal and the audio frequency signal, the radio frequency output signal being configured for transmission toward the unmanned vehicle via the antenna to interfere with the at least one first unmanned vehicle control signal. The present invention may further include a user interface comprising a presentation device and a parabolic antenna mounted to a primary weapon system. The present invention may further include a recorder configured to record at least one of the audio frequency signal and the audio output signal.

The present invention may further include wherein the recorder is further configured to record one or more of time stamp information, location information, received radio frequency signal characterizing information, output radio frequency signal characterizing information, antenna orientation, unmanned vehicle direction information, unmanned vehicle control channel information and unmanned vehicle non-control-channel information.

The present invention may further include the apparatus wherein the recorder is further configured to record one or more of video information pertaining to the unmanned vehicle, encryption information pertaining to unmanned vehicle control signaling, GPS information and local time information. The present invention may further include the apparatus further comprising a network interface configured to communicate with a network, the network interface being operatively coupled to the recorder to transmit information stored therein. The present invention may further include wherein the apparatus is housed within a handle portion of a portable parabolic antenna.

The present invention may further include wherein the apparatus further comprises a data port operative to enable data transfer between the apparatus and communications devices.

The present invention may further include a method supporting rapid assessment of unmanned vehicles. The method including receiving a radio frequency signal associated with one or more unmanned vehicles; converting the radio frequency signal into a corresponding audio frequency signal; and processing the audio frequency signal to provide an audio output signal configured to generate an audible output signal through an output device, wherein properties of the audible output signal correlate with properties of the radio frequency signal such that a user can audibly ascertain a location of a first unmanned vehicle.

The present invention may further include a system supporting rapid assessment of unmanned vehicles. The system including a directional antenna, mounted on a primary weapons platform, for receiving a radio frequency signal associated with one or more unmanned vehicles; a radio frequency input module, for converting the received radio frequency signal into a corresponding audio frequency signal; and an audio processing module, for processing the audio frequency signal to provide an audio output signal configured to generate an audible output signal through an output device, wherein properties of the audible output signal correlate with properties of the radio frequency signal such that a user can audibly ascertain a location of a first unmanned vehicle changing a targeting direction of the directional antenna wherein the targeting direction is toward the moving unmanned vehicle.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
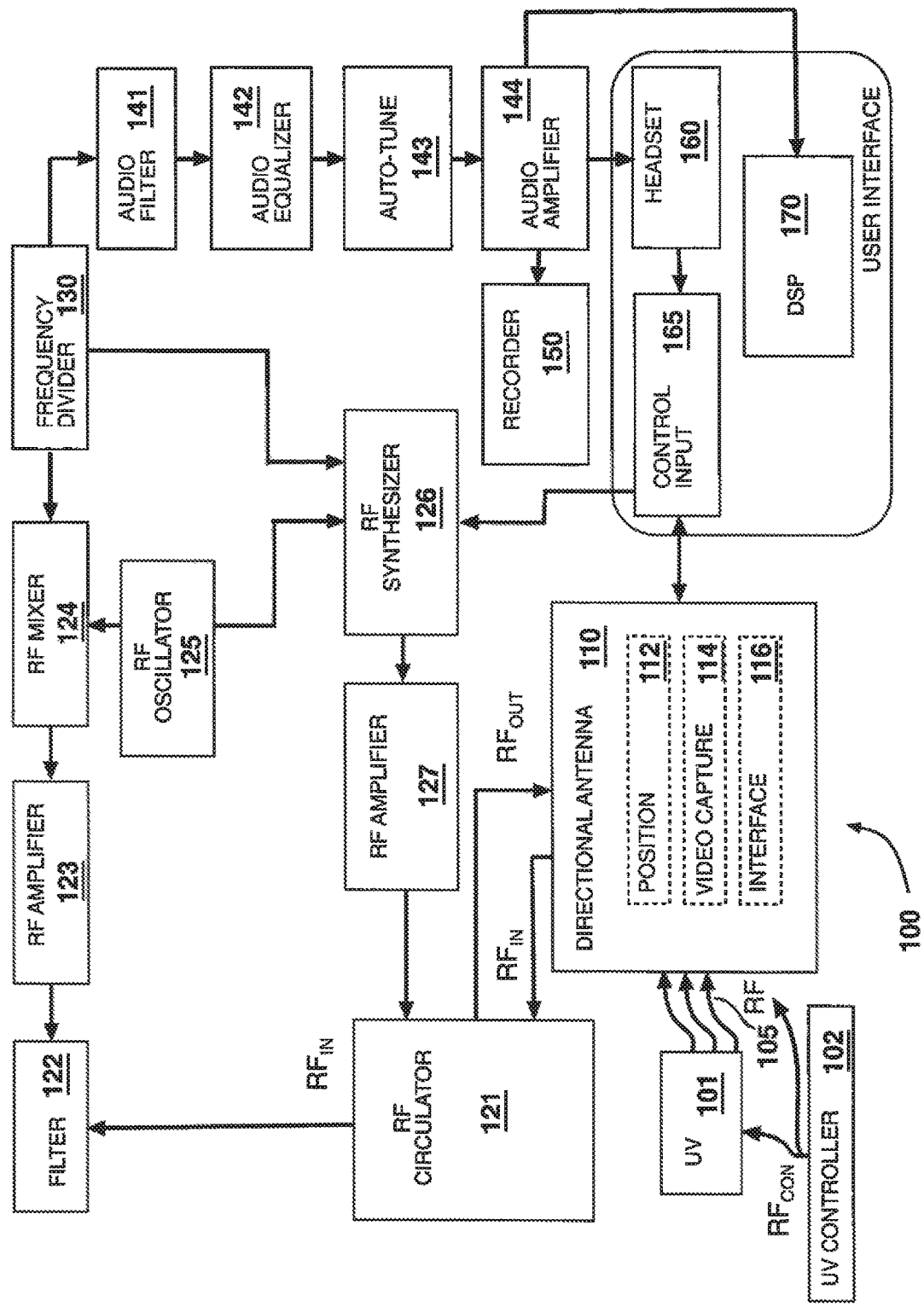
FIG. 1 depicts a block diagram of a system according to one embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments provide light ground forces with a small, lightweight, power efficient, intuitive, effective, and easy-to-use tool for mitigating improvised weaponized drones. The embodiments address the need for light ground forces to be able to counteract small weaponized semi-autonomous aircraft, ground vehicles and the like such as weaponized small commercial drones.

Generally speaking, in accordance with various embodiments radiofrequency emanations of a target drone are modulated into the audible range giving a "voice" to the drone. Spread spectrum, frequency hopping and other characteristics of the signal create intuitively recognizable patterns that ground forces can rapidly interpret in a manner similar to that of interpreting the voices of friendly forces and enemy forces. Further, although friendly forces and enemy forces may use similar hardware and software (e.g., such as with commercial drones), the actual use of the drones is typically different in terms of tactics employed and the like such that drone operator inputs can vary to create patterns that can be recognized as friendly or enemy. It is noted that a differentiation between friendly and enemy drones may be provided via user configurable options in the drone software, firmware, hardware and the like such as software/firmware applications, flash memory, programmable read only memory, switch settings and the like.

In more detail, an isotropic receiver antenna is used to detect drone activity. Filters and amplifiers limit the signal to those relevant to the threat class of drones. Once the user is alerted to drone activity, he or she employs a small parabolic dish antenna to manually direction-find (DF) the source. The strength of the signal will correspond to a rise in volume of the audible signal similarly to how other targeting systems produce "tone" when locked on. Based on the audible signal created by the drone, the operator uses his judgment to determine if it sounds threatening or not. In the case that it is threatening, the operator has the option to seek cover, or activate a jamming signal. The signal is transmitted through the dish that remains aimed by maximizing the produced tone. The jamming signal is synthesized based on the parameters obtained during the voice modulation process. This would take into account that fact that the downlink signal could have a different format than control signals. Furthermore to make the drone voices more recognizable, intelligent pitch shifting can be applied to the audible signal. This would be similar to the "auto-tune" device used for musical recordings. An audio recorder would be used to collect a record of all observations made.

Thus, various embodiments operate to translate radio frequency emanations from a drone or drone controller to an audio signal ("voice") so that a warfighter may quickly determine that a threat exists, where the threat is and what should be done about it.

Advantageously, the various embodiments provide an information-rich audio signal including audio spectrum components characteristic of specific drone types, control signal types and the like, these audio spectrum components being well suited for rapid analysis by a warfighter or an audio processing device (e.g., a digital signal processor (DSP) configured to identify specific audio characteristics and respond accordingly). Further, by processing the relevant drone-related information at audio frequency levels, the complexities of radio frequency processing are avoided. That is, an radio frequency mixer and frequency divider operate to convert drone-related information within the radio frequency spectrum energy (i.e., drone emanations, control signals and the like) into audio spectrum information which is then processed to provide an audio signal having characteristics associated with the particular type of drone, its emanations, its control signals and the like. Various embodiments contemplate that unmanned vehicle-related information may be derivable at different layers of radio frequency-based communication protocols and protocol stacks, including those associated with control signals, sensor data links, telemetry links and their various frequencies, bandwidths, modulation schemes, coding schemes, error correction schemes, encryption schemes and the like.

FIG. 1 depicts a block diagram of a system according to one embodiment. Specifically, the system 100 of FIG. 1 may be implemented as a man portable system enabling a war fighter to identify one or more approaching drones or related threats, determine a direction associated with the identified drones/threats and initiate countermeasures to the identified drones/threats.

The system 100 of FIG. 1 generally comprises a directional antenna 110 configured to receive radiofrequency (RF) emanations such as telemetry signals, sensor data, control signals $RF_{CON}$ and the like 105 associated with at least one unmanned vehicle 101 and/or unmanned vehicle ground controller/transmitter 102 (e.g., 2.4 GHz+/−100 MHz) and provide received radio frequency input signal $RF_{IN}$ to radio frequency input processing circuitry. The radio frequency emanations may be received directly from a unmanned vehicle 101 or unmanned vehicle controller 102, or indirectly such as via a scattering of the ground transmitted signal from the unmanned vehicle to an antenna of the system 100.

The radio frequency input processing circuitry is configured to perform various processing functions for down-converting drone-related radio frequency information to corresponding drone-related audio information. The drone-related audio information is processed by audio processing circuitry configured to provide temporal and/or spectral processing of the drone-related audio information such that an audio signal may be presented to a warfighter/user (e.g., via a headset) enabling the user to "hear" information pertaining to the position, velocity, direction of travel and/or other characteristics of one or more drones from which radio frequency emanations and/or related radio frequency control signaling have been received. In various embodiments, radio frequency output processing circuitry is configured to provide an output radio frequency signal $RF_{OUT}$ suitable for use by drone countermeasure systems and other command and control systems (e.g., an radio frequency output signal comprising a carrier frequency having modulated thereon a signal conforming to a spectral envelope associated with one or more spectral regions associated with unmanned vehicle control signals). In various embodiments, a user interface is provided to enable a warfighter/user to control various aspects of the system, adjust processing parameters, receive presented audio information and so on. Various embodiments contemplate receiving signals from both the unmanned vehicle and the control station either directly or via bistatic scattering from the unmanned vehicle. In various embodiments, the user interface comprises a presentation device (e.g., touch screen computer display and the like) mounted with a parabolic antenna such as to a primary weapon system.

As depicted herein, the radio frequency input processing circuitry comprises radio frequency circulator (or diplexer) 121, filter 122, radio frequency amplifier 123, radio frequency mixer 124, radio frequency oscillator 125 and frequency divider 130. It is noted that other radio frequency input processing configurations suitable for use in performing the relevant radio frequency input processing functions as described herein are also contemplated by the inventors.

As depicted herein, the audio processing circuit comprises audio filter 141, audio equalizer 142, auto tuner 143, audio amplifier 144 and/or recorder 150. It is noted that other processing circuitry suitable for use in performing the relevant audio processing functions as described herein are also contemplated by the inventors.

As depicted herein, the user interface comprises headset 160, control input 165 and digital signal processor (DSP) 170. It is noted that other processing circuitry suitable for use in performing the relevant user interface functions as described herein are also contemplated by the inventors.

As depicted herein, the radio frequency output processing circuitry comprises radio frequency synthesizer 126, radio frequency amplifier 127, radio frequency oscillator 125 and radio frequency circulator (or diplexer) 121. It is noted that other radio frequency output processing configurations suitable for use in performing the relevant radio frequency output processing functions as described herein are also contemplated by the inventors.

The antenna 110 may comprises a directional antenna configured to provide increasing gain to the received radio frequency signal as the antenna is directed toward the unmanned vehicle. The antenna may comprise, illustratively, a hand-held or man-portable parabolic antenna, helical antenna, Yagi-Uda antenna and/or a phased array antenna. The directional antenna 110 may include one or more optional modules such as a position module 112 configured to determine antenna position or orientation (e.g., location such as global Positioning System (GPS) location, XYZ orientation such as indicative of current direction/elevation and/or other position related information), a video capture module 114 (e.g., to capture still or moving imagery associated with direction antenna is pointed and/or surrounding area) and interface 116 (e.g., to communication position, direction and/or image information to a control system.

Various embodiments contemplate an antenna with user-adjustable directionality such as a wide angle vs. narrow angle (e.g., "telephoto lens") adjustment with or without a camera/optical functionality. Specifically, in such embodiments, as a user narrows down the direction/location of the unmanned vehicle they are further able to narrow down the directionality of the antenna such that a more accurate location of the unmanned vehicle may be determined and, if the user decides to transmit toward the unmanned vehicle, a more focused transmission may be generated thereby such that more power is placed upon the target.

The received radio frequency input signal $RF_{IN}$ is provided by the antenna 110 to filter 122 via radio frequency circulator 121. Filter 122 is configured to perform, illustratively, bandpass filtering of received signal to restrict the frequency range to that associated with drone emanations, drone control signals and the like, as well as to reduce noise within a resulting filtered radio frequency signal, which filtered radio frequency signal amplified by radio frequency amplifier 104 and coupled to radio frequency mixer 124.

radio frequency mixer 124 mixes the filtered/amplified radio frequency signal received from the radio frequency amplifier 123 with an radio frequency signal received from radio frequency oscillator 125 to produce a down-converted radio frequency signal which is coupled to frequency divider 130. For example, assuming drone-related radio frequency information comprising 2.4 GHz band radio frequency signaling with a frequency spread of 50-100 MHz, if radio frequency oscillator 125 provides a 2.4 GHz signal to the radio frequency mixer, the resulting output signal of the radio frequency mixer comprises the 50-100 MHz signaling information, which is then divided from radio frequency spectrum levels to audio spectrum levels by frequency divider 130 such as to provide, illustratively, a 1000 to 2000 Hz representation of 50-100 MHz signaling information.

Radio frequency oscillator 125 is configured to provide a demodulation/tuning signal for radio frequency mixer 124 portion, as well as a synthesizer signal for radio frequency synthesizer 126. radio frequency output module such that the radio frequency output signal comprises a carrier frequency having modulated thereon a signal conforming to a spectral envelope associated with the one or more spectral regions associated with unmanned vehicle control signals. The radio frequency output module may be configured for generating a radio frequency output signal in response to at least one of an IF signal and an audio frequency signal, wherein the radio frequency output signal is configured for transmission toward the unmanned vehicle via the antenna to thereby interfere with the unmanned vehicle control signals.

Once the drone-related radio frequency emanation/signaling information is reduced to corresponding audio range emanation/signal, one or more of the following audio processing modules may be used, in any order, to perform various audio processing functions upon the corresponding audio range emanation/signal prior to the signal being directed to a headset 160, recorder 150 or digital signal processor (DSP) 170. An audio filter 141 may be used to remove extreme high or low frequency components (e.g., "screeching," "rumbling" and/or other unwanted audio artifacts). An audio equalizer 142 may be used to emphasize and/or deemphasize various audible tones or components of the drone-related audio information. In particular, the audio equalizer 142 may be used to rebalance the drone-related audio range emanation/signal to improve clarity, uniqueness, audio balance and/or other characteristics (e.g., where different tones are relatively quiet or loud and a balancing of the tones is desired). That is, different tones may be emphasized or deemphasized to provide a more balanced audio signature or "voice" associated with the initially received drone-related radio frequency emanation/signaling information. An auto-tuner 144 may take different tones or components thereof from the audio signal and assign these tones/components to appropriate spectral bins to generate thereby spectral histograms and the like, such as for subsequent automated processing of the audio. Audio amplifier 144 may be used to modify the processed audio signal for use by a headset 160, recorder 150 and/or DSP 170.

Generally speaking, the audio processing module comprises audio frequency adaptation components configured to adjust a spectral profile of an audio output signal derived from the drone-related radio frequency emanation/signaling information (e.g., a spectral "signature" of a unmanned vehicle). The audio processing module may comprise at least one of an audio filter configured to limit a spectral range of the audio frequency signal, an audio equalizer configured to adjust power levels of each of a plurality of spectral regions and an audio amplifier. The audio frequency adaptation components may further comprise an auto-tune module configured to shift individual frequency components to a closest configured frequency range or bin, such as represented by a statistical sampling of frequencies arranged as a plurality of frequency bins where each bin represents a subset of the entire range of sampled frequencies. In this manner, a spectral profile may be formed and/or augmented with spectral bin information.

The headset 160 may be used by war fighter to listen to audio range emanations/signals corresponding to drone-related radio frequency emanations/signals to enable rapid identification and response to known threats. Further, the war fighter may use a control input 165 to initiate various countermeasures as will be discussed in more detail below.

The recorder 150 may be used to record the audio range emanations/signals corresponding to drone-related radio frequency emanations/signals to enable study of the various signals so that the audio signature or voice associated with various drones and, more broadly, drone-related threat situations may be better understood and incorporated into subsequent training and evaluation programs. For example, each of a plurality of different drones is associated with a respective audio signature or voice. A received/recorded audio signature or voice may be different depending upon the type of drones, number of drones and so on included within a threat package and it is desirable to fully understand each threat package to the maximum extent possible. Further, evolving countermeasures might be such that the received/recorded audio signature or voice of different drones may change over time as control methodologies, uplink protocols and the like vary. Further, radio frequency emanations from a drone may change over time as the drone is subject to normal wear and tear. Various other changes with respect to receive/recorded audio suture or voice information are contemplated by the inventors.

Various embodiments contemplate that the recorder 150 is used to locally store some or all of the time-history of the received signals such that the stored signals may be used to generate a jamming signal even when the received signal fades out due to terrain or orientation of the unmanned vehicle. These embodiments find particular utility within the context of using a bistatic collection scheme as described herein since the received signal strength will depend on the orientation of the vehicle. Thus, in various embodiments the recorder 150 may be configured to record one or more of time stamp information, location information, received radio frequency signal characterizing information, output radio frequency signal characterizing information, antenna orientation, unmanned vehicle direction information, unmanned vehicle control channel information and unmanned vehicle non-control-channel information, video information pertaining to the unmanned vehicle, encryption information pertaining to unmanned vehicle control signaling, GPS information, local time information and/or any other information generated by or received by the system described herein.

The DSP 170 may be used to provide automated processing of received/recorded audio signature or voice information to provide rapid machine-based threat evaluation and response selection. The DSP 170 may be operably coupled to the control input 165 to activate countermeasures in a manual, semiautonomous or fully autonomous manner. The DSP 170 may be included within user interface circuitry as depicted in FIG. 1, or within other equipment communicatively coupled to the system 100 of FIG. 1.

In various embodiments, the directional antenna 110 may be utilized to locate a drone by having a warfighter/user vary the direction and inclination of the antenna to scan the surrounding area and airspace. In this embodiment, an increasing volume level received by the user via the headset 160 and associated with an audio signature or voice of a potentially threatening drone abused by the war fighter to quickly and accurately pinpoint the location of the drone or drones. In various embodiments, the controller 155 includes further circuitry designed to generate countermeasure signals suitable for transmission toward the drone via the directional antenna 110. Such countermeasure signals may include spoofed control signals, jamming signals and the like.

Various embodiments contemplate a directional antenna, such as a parabolic antenna, mounted on a primary weapons platform or system such as a rifle, electronic countermeasures platform and the like such that manual direction-find (DF) procedures associated with determining a location of an unmanned vehicle result in at least a general targeting of the unmanned vehicle by the primary weapons platform or electronic countermeasures platform.

Various embodiments contemplate that the electronics, user interface and/or other portions of the system 100 of FIG. 1 may be mounted within a handle of a directional antenna.

Figure 2:
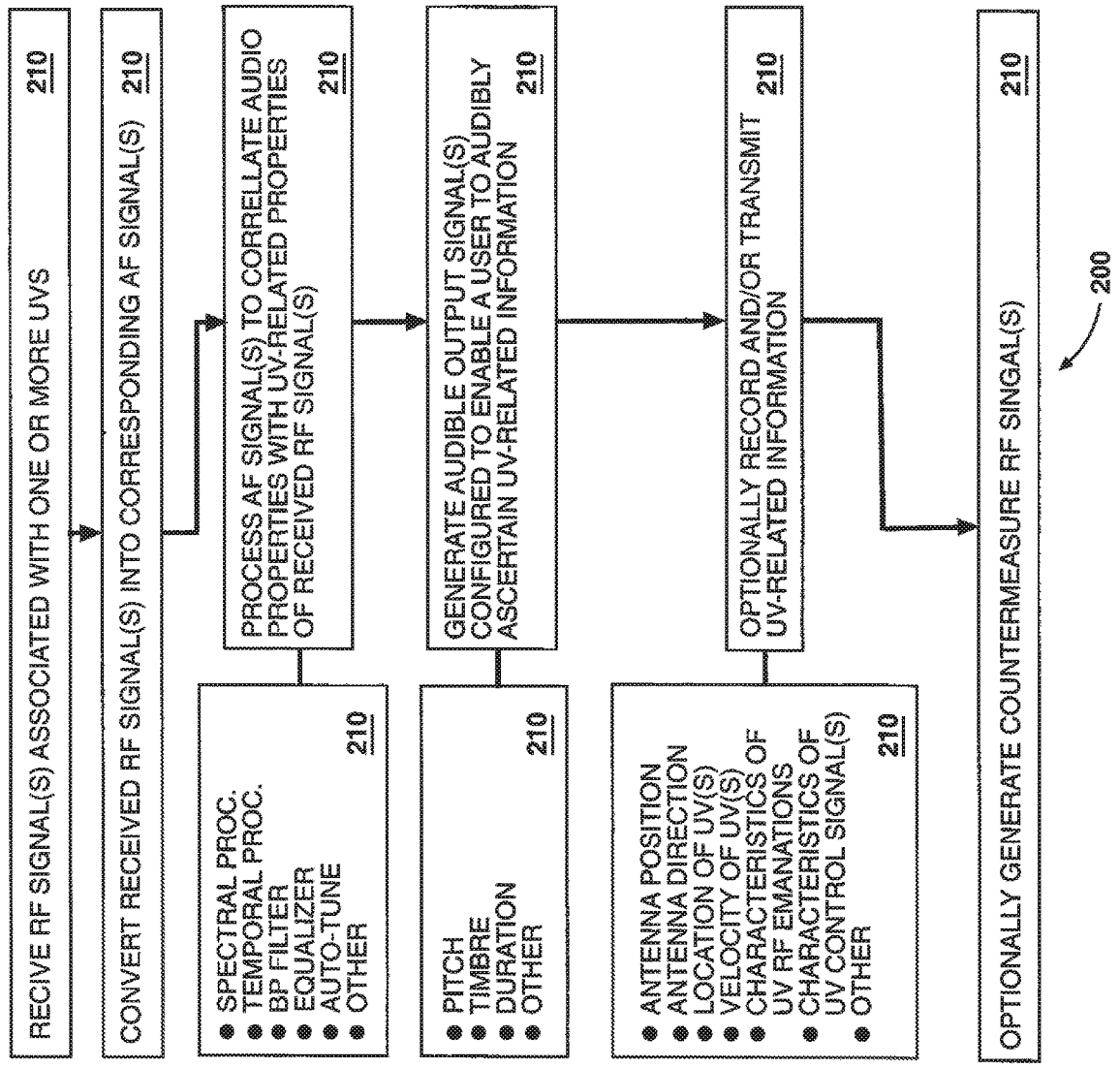
FIG. 2 depicts a flow diagram of a method according to an embodiment.

FIG. 2 depicts a flow diagram of a method according to an embodiment. Specifically, FIG. 2 depicts a method 200 of receiving and processing radio frequency information associated with one or unmanned vehicles such as described above with respect to FIG. 1.

At step 210, radio frequency signals associated with one or more unmanned vehicles are received, such as via antenna 110. It is noted the received radio frequency signals include various properties and/or characteristics associated with or otherwise indicative of unmanned vehicle emanations, unmanned vehicle control signaling and the like.

At step 220, the received radio frequency signals are converted into audio frequency (AF) signals such as via the radio frequency input processing circuitry described above, wherein the audio frequency signals include various properties and/or characteristics corresponding to those of the unmanned vehicle emanations, unmanned vehicle control signaling and the like of the received radio frequency signals.

At step 230, the audio frequency signals are processed such that the various properties and/or characteristics corresponding to those of the unmanned vehicle emanations, unmanned vehicle control signaling and the like are enhanced and/or otherwise rendered audible in a manner facilitating detection/discrimination of unmanned vehicle-related information by a warfighter/user, such as via the audio processing circuitry described above. As noted with respect to box 235, such processing may include spectral processing, temporal processing, bandpass filtering and other filtering, frequency equalization functions, autotune functions as well as other functions.

At step 240, one or more audible output signals are generated based upon the processed audio frequency signals and configured to enable a user to audibly ascertain unmanned vehicle-related information, such as via the audio processing circuitry described above. As noted with respect to box 245, such audible output signals are modified in terms of pitch, timbre, duration and/or other properties such that the unmanned vehicle-related information may be discernible to the warfighter/user. In various embodiments, the properties of a generated audible output signal correlate with properties of the received radio frequency signal such that a user can audibly ascertain a direction of travel, position/ location and so on associated with one or more unmanned vehicles. In various embodiments, the properties of the generated audible output signal correlate with properties of the received radio frequency signal such that a user can audibly ascertain at least one of a location and direction of travel of one or more additional unmanned vehicles. In various embodiments, the properties of the audio signal comprise at least one of pitch, timbre and duration.

At step 250, unmanned vehicle-related information is optionally recorded and/or transmitted, such as via the recorder 150, user interface and other circuitry as described above. Referring to box 255, such unmanned vehicle-related information may comprise antenna position, antenna direction, location of one or more unmanned vehicles, velocity of one or unmanned vehicles, characteristics associated with unmanned vehicle radio frequency emanations, characteristics associated with unmanned vehicle control signal(s) and/or other information.

At step 260, one or more countermeasure radio frequency signals are generated and transmitted, such as via radio frequency output processing circuitry and antenna 110.

The various embodiments represent a major improvement in relation to the state of the art. The key advantages of this invention are that it can be effective against relevant threats, requires minimal user training, is small, lightweight, and man portable, and leverages the users' mental capacity for sensing and identifying threats that has been developed over a lifetime. It also has the potential to enable a more responsive electronic attack decision loop and minimize electronic fratricide. It can be used to distinguish enemy from friendly operated systems even consisting of the same type of hardware. This invention is important to the Air Force mission as it will help protect installations and dismounted forces from improvised drone attacks. It is anticipated that in addition to Air Force applications there will also be a commercial demand.

Figure 3:
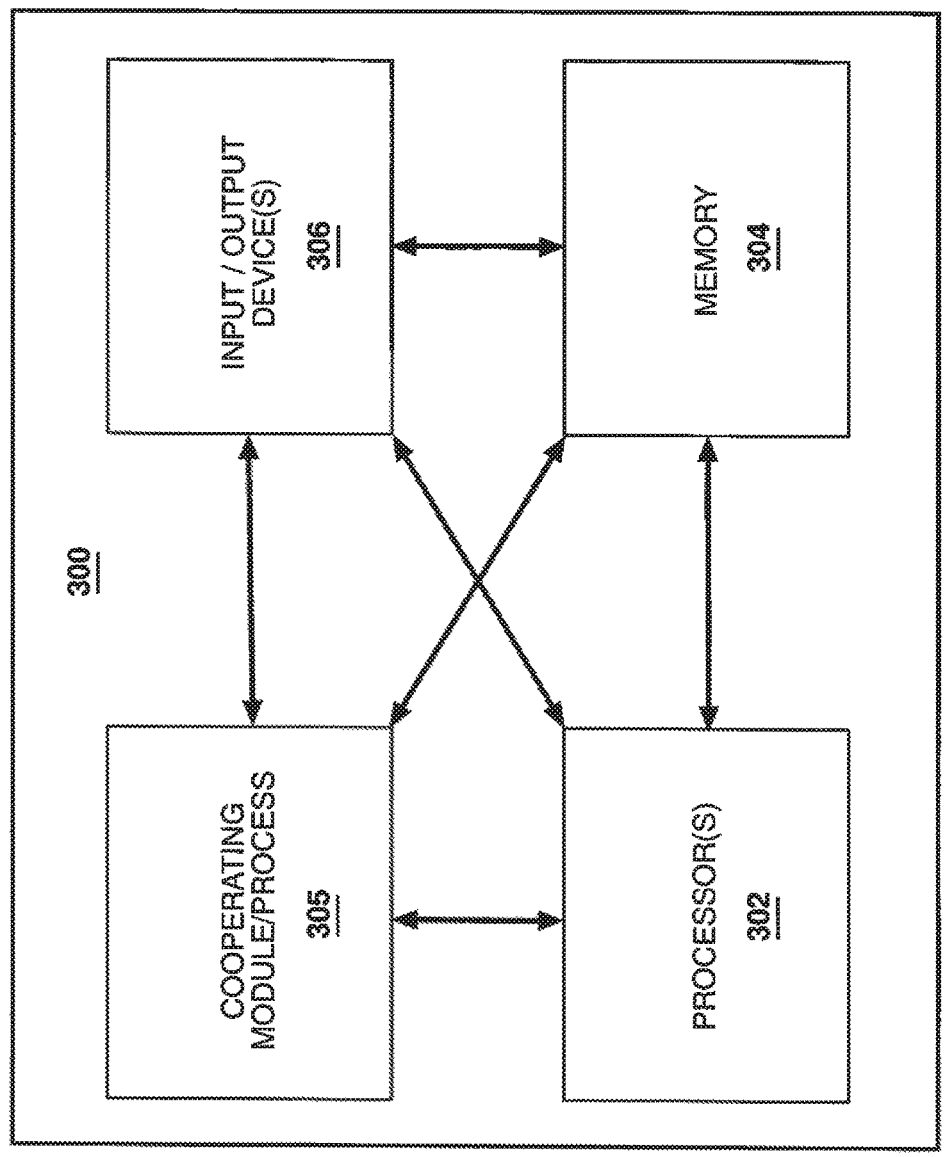
FIG. 3 depicts a high-level block diagram of a computing device suitable for use in various embodiments.

FIG. 3 depicts a high-level block diagram of a computing device, such as a DSP or other controller in a system according to the various embodiments described herein to the figures. In particular, any of the various functional entities described herein may be implemented in accordance with a general computing device structure such as described herein with respect to FIG. 3.

As depicted in FIG. 3, computing device 300 includes a processor element 302 (e.g., a central processing unit (CPU) or other suitable processor(s)), a memory 304 (e.g., random access memory (RAM), read only memory (ROM), and the like), a cooperating module/process 305, and various input/output devices 306 (e.g., communications modules, network interface modules, receivers, transmitters and the like) such as a data port operative to enable data transfer between the apparatus and various communications devices.

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 305 can be loaded into memory 304 and executed by processor(s) 302 to implement the functions as discussed herein. Thus, cooperating process 305 (including associated data) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus supporting rapid assessment of an unmanned vehicle by a user, comprising:
    an antenna, for receiving a radio frequency signal associated with one or more unmanned vehicles, the radio frequency signal having at least one radio frequency signal property;
    a radio frequency input module, for converting the radio frequency signal into a corresponding audio frequency signal; and
    an audio processing module, for processing the corresponding audio frequency signal to provide an audible output signal having at least one audible output signal property, further configured to generate the audible output signal through an output device, wherein at least one audible output signal property correlates with at least one radio frequency signal property such that the user can audibly ascertain the location of an unmanned vehicle, the unmanned vehicle being capable of receiving at least one unmanned vehicle control signal;

wherein the audio processing module comprises frequency adaptation components configured to adjust a spectral profile of the audio output signal;

wherein the frequency adaptation components comprise at least one of an audio filter configured to limit a spectral range of the corresponding audio frequency signal, an audio equalizer configured to adjust power levels of each of a plurality of spectral regions and an audio amplifier;

wherein the radio frequency input module includes a radio frequency demodulator configured to extract an intermediate frequency signal associated with one or more spectral regions associated with unmanned vehicle control signals, and a frequency divider configured to generate the audio frequency signal using the intermediate frequency signal; and also comprising a radio frequency output module, for generating a radio frequency output signal in response to the corresponding audio frequency signal, the radio frequency output signal being configured for transmission toward the first unmanned vehicle, via the antenna to interfere with at least one unmanned vehicle control signal; and further comprising a radio frequency oscillator configured to provide a demodulation tuning frequency for the radio frequency input module and a synthesizer frequency for the radio frequency output module such that the radio frequency output signal comprises a carrier frequency having modulated thereon a signal conforming to a spectral envelope associated with the one or more spectral regions associated with at least one unmanned vehicle control signal.

2. The apparatus of claim 1, wherein at least one audible output signal property correlates with at least one radio frequency signal property such that the user can audibly ascertain a direction of travel of the unmanned vehicle.

3. The apparatus of claim 1, wherein at least one audible output signal property correlates with at least one radio frequency signal property such that the user can audibly ascertain a global positioning system (GPS) position of the unmanned vehicle.

4. The apparatus of claim 1, wherein at least one audible output signal property correlates with at least one radio frequency signal property such that the user can audibly ascertain at least one of a location and direction of travel of one or more additional unmanned vehicles.

5. The apparatus of claim 1, wherein at least one audible output signal property comprises at least one of pitch, timbre and duration.

6. The apparatus of claim 1, wherein the antenna is a directional antenna configured to provide increasing gain to the radio frequency signal as the antenna is directed toward the unmanned vehicle.

7. The apparatus of claim 6, wherein the antenna comprises any of a hand-held parabolic antenna, helical antenna, Yagi-Uda antenna and a phased array antenna.

8. The apparatus of claim 7, wherein the antenna includes an angle adjustment capability.

9. The apparatus of claim 1, wherein the frequency adaptation components further comprise an auto-tune module configured to shift individual frequency components to a closest configured frequency bin.

10. The apparatus of claim 1, wherein the radio frequency output module is operative to forward the radio frequency output signal to the antenna in response to a trigger signal.

11. The apparatus of claim 10, further comprising at least one of a radio frequency circulator and a diplexer for coupling the forwarded radio frequency output signal to the antenna.

12. The apparatus of claim 1, further comprising a radio frequency output module, for generating a radio frequency output signal in response to at least one of the radio frequency signal and the audio frequency signal, the radio frequency output signal being configured for transmission toward the unmanned vehicle via the antenna to interfere with at least one unmanned vehicle control signal.

13. The apparatus of claim 1, further comprising a user interface comprising a presentation device and a parabolic antenna mounted to a primary weapon system.

14. The apparatus of claim 1, further comprising a recorder configured to record at least one of the audio frequency signal and the audio output signal.

15. The apparatus of claim 14, wherein the recorder is further configured to record one or more of time stamp information, location information, received radio frequency signal characterizing information, output radio frequency signal characterizing information, antenna orientation, unmanned vehicle direction information, unmanned vehicle control channel information and unmanned vehicle non-control-channel information.

16. The apparatus of claim 15, wherein the recorder is further configured to record one or more of video information pertaining to the unmanned vehicle, encryption information pertaining to unmanned vehicle control signaling, GPS information and local time information.

17. The apparatus of claim 14, further comprising a network interface configured to communicate with a network, the network interface being operatively coupled to the recorder to transmit information stored therein.

18. The apparatus of claim 1, wherein the apparatus is housed within a handle portion of a portable parabolic antenna.

19. The apparatus of claim 18, wherein the apparatus further comprises a data port operative to enable data transfer between the apparatus and a communications device.

* * * * *